United States Patent
Sannoh

(10) Patent No.: US 8,201,812 B2
(45) Date of Patent: Jun. 19, 2012

(54) VISCOUS FLUID-SEALING DAMPER

(75) Inventor: Toshiyuki Sannoh, Ina (JP)

(73) Assignee: Kabushiki Kaisha Kenwood, Hachiouji-shi, Tokyo (JP)

( * ) Notice: Subject to any disclaimer, the term of this patent is extended or adjusted under 35 U.S.C. 154(b) by 480 days.

(21) Appl. No.: 12/447,062

(22) PCT Filed: Nov. 7, 2007

(86) PCT No.: PCT/JP2007/071611
§ 371 (c)(1),
(2), (4) Date: Apr. 24, 2009

(87) PCT Pub. No.: WO2008/056689
PCT Pub. Date: May 15, 2008

(65) Prior Publication Data
US 2009/0321200 A1    Dec. 31, 2009

(30) Foreign Application Priority Data
Nov. 10, 2006  (JP) .................................. 2006-304854

(51) Int. Cl.
*F16F 5/00* (2006.01)
*F16F 9/10* (2006.01)
(52) U.S. Cl. .................... 267/140.13; 267/293
(58) Field of Classification Search ........... 267/64.11, 267/64.13, 64.27, 140.11, 140.12, 140.13, 267/292, 293
See application file for complete search history.

(56) References Cited

U.S. PATENT DOCUMENTS

| | | | | |
|---|---|---|---|---|
| 2,380,899 | A | * | 7/1945 | Strachovsky ............ 267/140.11 |
| 7,549,619 | B2 | * | 6/2009 | Ohki ........................ 267/140.13 |
| 2007/0029149 | A1 | * | 2/2007 | Ohki ........................ 267/64.11 |
| 2009/0032675 | A1 | * | 2/2009 | Miyakosawa et al. ... 267/140.11 |

FOREIGN PATENT DOCUMENTS

| | | | |
|---|---|---|---|
| JP | 11-201217 | | 7/1999 |
| JP | 2003-097631 | | 4/2003 |
| JP | 2003139183 | A * | 5/2003 |
| JP | 2004-218833 | | 8/2004 |

OTHER PUBLICATIONS

International Preliminary Report (Application No. PCT/JP2007/071611) dated May 29, 2009.
International Search Report for PCT/JP2007/071611.

* cited by examiner

*Primary Examiner* — Thomas J Williams
(74) *Attorney, Agent, or Firm* — Eric J. Robinson; Robinson Intellectual Property Law Office, P.C.

(57) ABSTRACT

A viscous fluid-sealed damper (1) having a shaft receiving section (2c) in which an installation shaft (3) with a swollen head (3b) is fitted and also having a separation wall (2). At least a portion of the separation wall (2) is constructed from an elastic separation membrane, and the separation wall (2) continues to the periphery of the upper edge of the shaft receiving section (2c) such that the shaft receiving section (2c) extends inward. Viscous fluid is sealed inside the separation wall (2). A positioning section (2f) for positioning the shaft receiving section (2c) is provided at that position of a bottom face (2a) of the separation wall section (2) that faces the shaft receiving section (2c). The viscous fluid-sealed damper can be assembled with good work efficiency and is unlikely to be damaged during assembly.

3 Claims, 7 Drawing Sheets

PRIOR ART

PRIOR ART

VISCOUS FLUID-SEALING DAMPER

TECHNICAL FIELD

The present invention relates to electronics and, in particular, to a viscous-fluid-sealing damper suitable for in-vehicle electronics.

BACKGROUND ART

Conventionally, as for disk players, such as CD, DVD, and MD, or other in-vehicle electronics, etc., the viscous-fluid-sealing damper has been used in order to damp vibration transmitted from outside to a mechanism chassis. An example of such an in-vehicle CD player is shown in FIG. 5. An outer frame chassis 10 shown in FIG. 5 is fixed to a concave portion of a vehicle in which the electronics are housed. A mechanism chassis 11 for supporting a disk rotation drive section and an optical pickup drive system is supported by the outer frame chassis 10 in a floating state through a viscous-fluid-sealing damper 12 and 12 . . . . Subsequently, even if the outer frame chassis 10 vibrates with the vehicle when the vehicle is being driven, vibration of the mechanism chassis 11 is damped, thus enabling to read a CD normally.

An example of such the viscous-fluid-sealing damper is disclosed in Patent Document 1. Namely, the viscous-fluid-sealing damper 12 shown in FIG. 6 is such a damper that a viscous-fluid 14 is encapsulated in a partition wall 13 composed of a bottom surface 13a, a bursiform section 13b, and a shaft receiving section 13c, and most of the bursiform sections 13b and the shaft receiving sections 13c are formed of a rubber elastic body.

This bottom surface 13a is fixed to the outer frame chassis 10, and an installation shaft 3 set up on the mechanism chassis 11 is fitted in the shaft receiving section 13c as shown by an arrow. A swollen head 3b larger than a shaft component 3a in diameter is formed at a tip of the shaft component 3a of the installation shaft 3, and a latching concave portion 13e with large diameter is formed at a tip of an insertion concave portion 13d of the shaft receiving section 13c, and the swollen head 3b of the installation shaft 3 fits into the latching concave portion 13e, so that the installation shaft 3 is fitted in the shaft receiving section 13c.

Patent Document 1: Japanese Patent Application Laid-Open No. 2004-340378, Paragraphs 0017 to 0032, FIG. 1

DISCLOSURE OF THE INVENTION

As for the above-described conventional viscous-fluid-sealing damper 12, the installation shaft 3 of the mechanism chassis 11 is pressed into the shaft receiving section 13c in a state where the bottom surface 13a is fixed to the outer frame chassis 10, and at this time, when the installation shaft 3 is arranged coaxially with the insertion concave portion 13d of the shaft receiving section 13c to be inserted in a radial direction by applying force, the shaft receiving section 13c is elastically deformed, and thereby the shaft can be inserted normally.

However, when the installation shaft 3 is inserted into the insertion concave portion 13d from an oblique direction as shown in FIG. 7, the shaft receiving section 13c falls down obliquely in the partition wall 13, and thereby the installation shaft 3 cannot be inserted therein as shown in FIG. 7. Additionally, even if the installation shaft 3 is tried to be inserted linearly in such a state where the shaft receiving section 13c has fallen down, a tip of the shaft receiving section 13c moves as if it slipped to escape with respect to the bottom surface 13a, thus resulting in difficulty in inserting normally. For that reason, in some cases, working efficiency has been deteriorated, or the bursiform section 13b of the viscous-fluid-sealing damper 12 has been damaged.

The present invention is made in view of the above-described problems, and it aims at providing a viscous-fluid-sealing damper with good working efficiency and without possibility of damage at the time of assembly thereof.

A viscous-fluid-sealing damper according to the present invention is composed of a shaft receiving section having rubber elasticity for receiving an installation shaft in such a manner as to fit the installation shaft having a swollen head into an insertion concave portion of the shaft receiving section; and a partition wall for encapsulating a viscous-fluid therein, at least a portion of the partition wall being formed of a diaphragm having rubber elasticity, and the partition wall extending to periphery of upper edge of the shaft receiving section such that the shaft receiving section extends inward side of the partition wall; and wherein a positioning section for positioning the shaft receiving section is mounted at a position which is on a bottom surface of the partition wall and which faces with the shaft receiving section.

Further, in the above-described viscous-fluid-sealing damper, the positioning section for positioning the shaft receiving section is formed in a cylindrical shape, and has an R-shape on upper edge of inner surface.

Further, in the above-described viscous-fluid-sealing damper, the positioning section for positioning the shaft receiving section has at least one slit extending along axial direction of the cylindrical shape.

Further, in the same viscous-fluid-sealing damper as above, the positioning section for positioning the shaft receiving section is formed in a polygonal shape.

Further, in the same viscous-fluid-sealing damper as above, the positioning section for positioning the shaft receiving section is a concavity formed in a cylindrical shape on a bottom surface of the partition wall, has at least one groove extending along axial direction of the cylindrical shape, and has an R-shape on upper edge of inner surface of the positioning section.

Further, in the same viscous-fluid-sealing damper as above, the positioning section for positioning the shaft receiving section is a notch used for a slip resistance.

Further, in the same viscous-fluid-sealing damper as above, the positioning section for positioning the shaft receiving section is a plate-like member adhered to a bottom surface of the partition wall and having a large friction coefficient.

According to the viscous-fluid-sealing damper of the present invention, since the installation shaft can be reliably and stably inserted to a predetermined position, efficiency of an assembly operation improves, so that the viscous-fluid-sealing damper can be effectively prevented from being damaged. Additionally, as for the viscous-fluid-sealing damper having a protrusion provided on the bottom surface thereof, since flow resistance of the viscous-fluid increases, damping performance as a damper improves.

DESCRIPTION OF SYMBOLS

Figure 1:
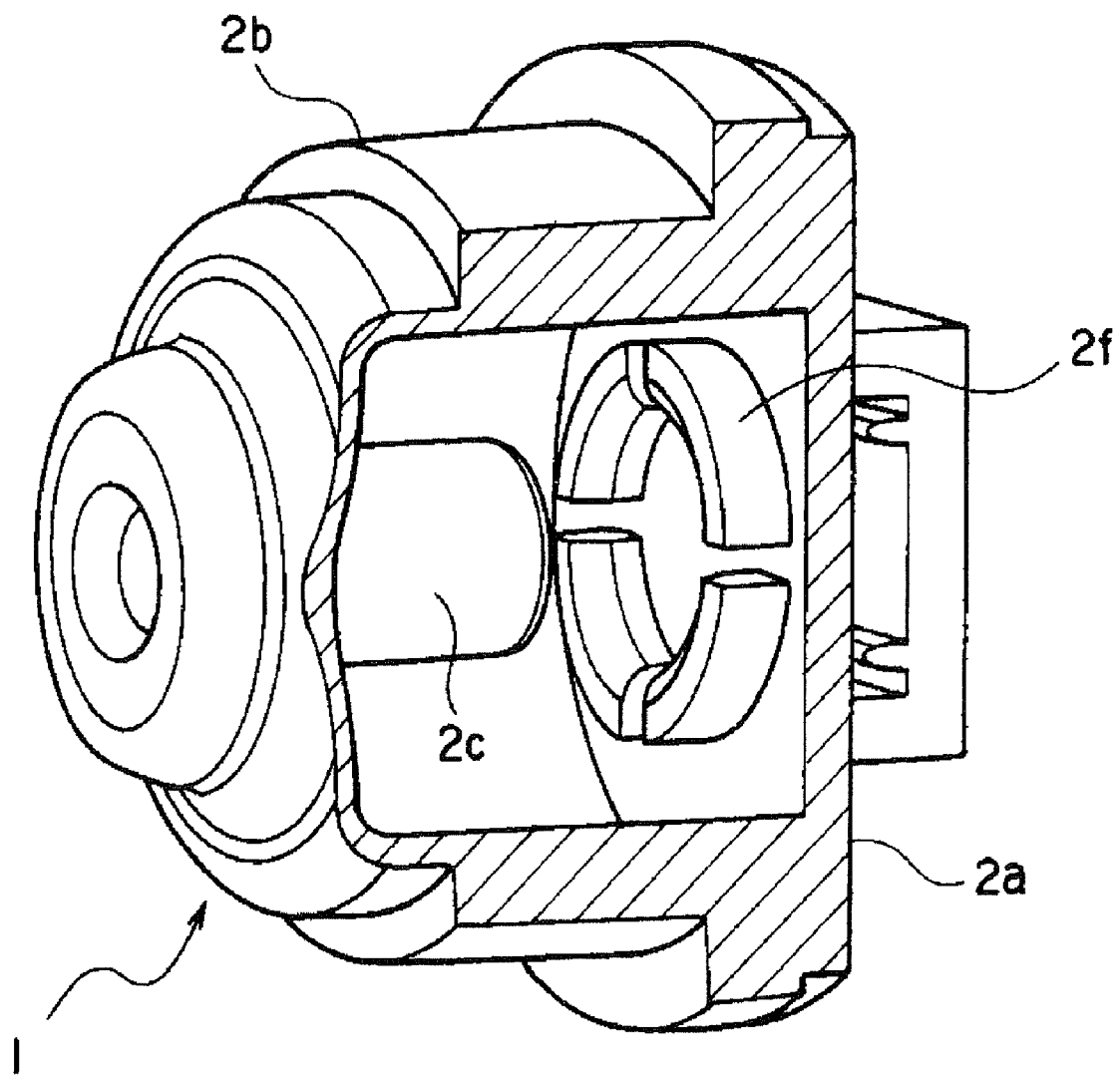
FIG. 1 is a perspective view showing a viscous-fluid-sealing damper with a part thereof notched according to a first embodiment of the present invention.

1 Viscous-fluid-sealing Damper
2 Partition Wall
2a Bottom surface
2b Bursiform section
2c Shaft receiving section
2d Insertion concave portion
2e Latching concave portion
2f Cylindrical convex portion
3 Installation Shaft
3a Shaft component
3b Swollen head
4 Viscous-fluid-sealing Damper
5 Partition Wall
5a Bottom surface
5b Bursiform section
5c Shaft receiving section
5d Boxy convex portion
6 Viscous-fluid-sealing Damper
7 Partition Wall
7a Bottom surface
7b Bursiform section
7c Shaft receiving section
7d Cylindrical concave portion
10 Outer Frame Chassis
11 Mechanism Chassis
12 Viscous-fluid-sealing Damper
13 Partition Wall
13a Bottom surface
13b Bursiform section
13c Shaft receiving section
13d Insertion concave portion
13e Latching concave portion
14 Viscous-fluid

BEST MODES FOR CARRYING OUT THE INVENTION

Best modes for carrying out the present invention will be explained hereinafter based on embodiments.

First Embodiment

Figure 2:
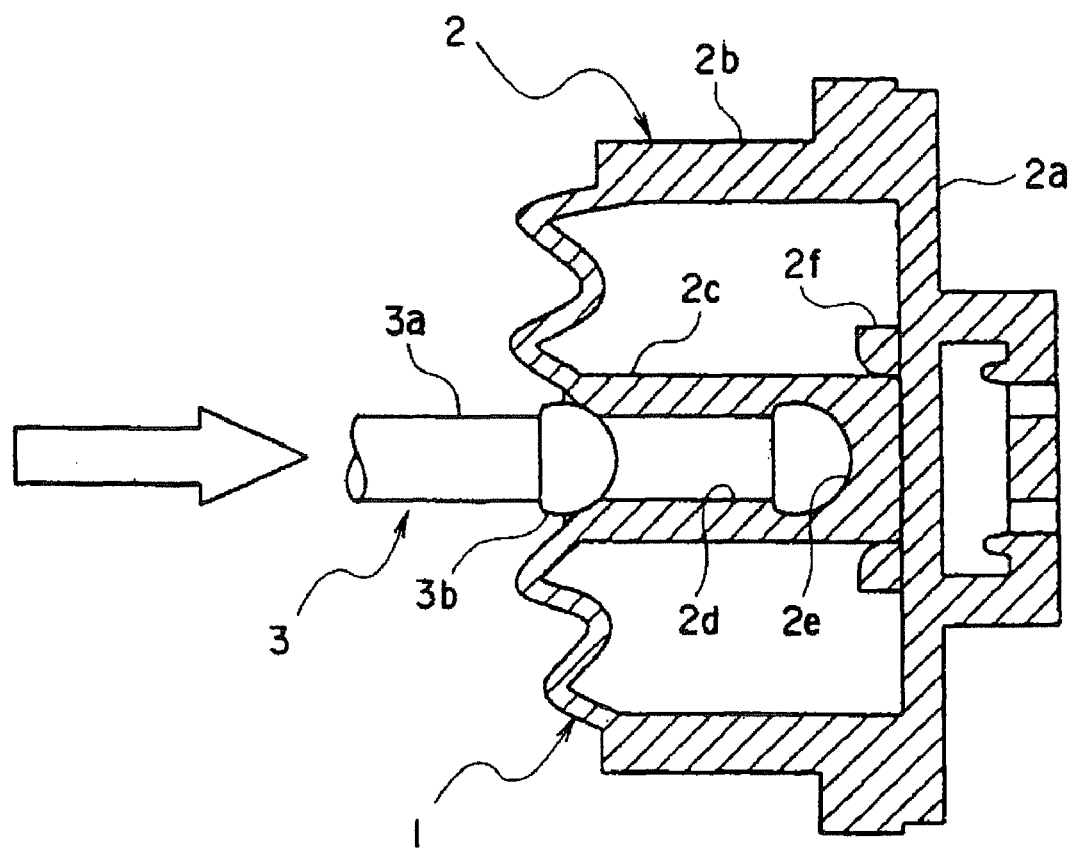
FIG. 2 is a sectional view showing an operating state of the same viscous-fluid-sealing damper as above.

FIG. 1 is a perspective view showing a viscous-fluid-sealing damper with a part thereof notched according to a first embodiment of the present invention, and FIG. 2 is a sectional view showing an operating state of the same viscous-fluid-sealing damper as above. As shown in FIGS. 1 and 2, a viscous-fluid-sealing damper 1 is composed of a shaft receiving section 2c having rubber elasticity; a hermetic container composed of a bursiform section 2b having rubber elasticity extending to periphery of upper edge of the shaft receiving section 2c, and a bottom surface 2a firmly attached to whole periphery of lower edge of a bursiform section 2b; and a viscous-fluid encapsulated in the hermetic container.

Figure 5:
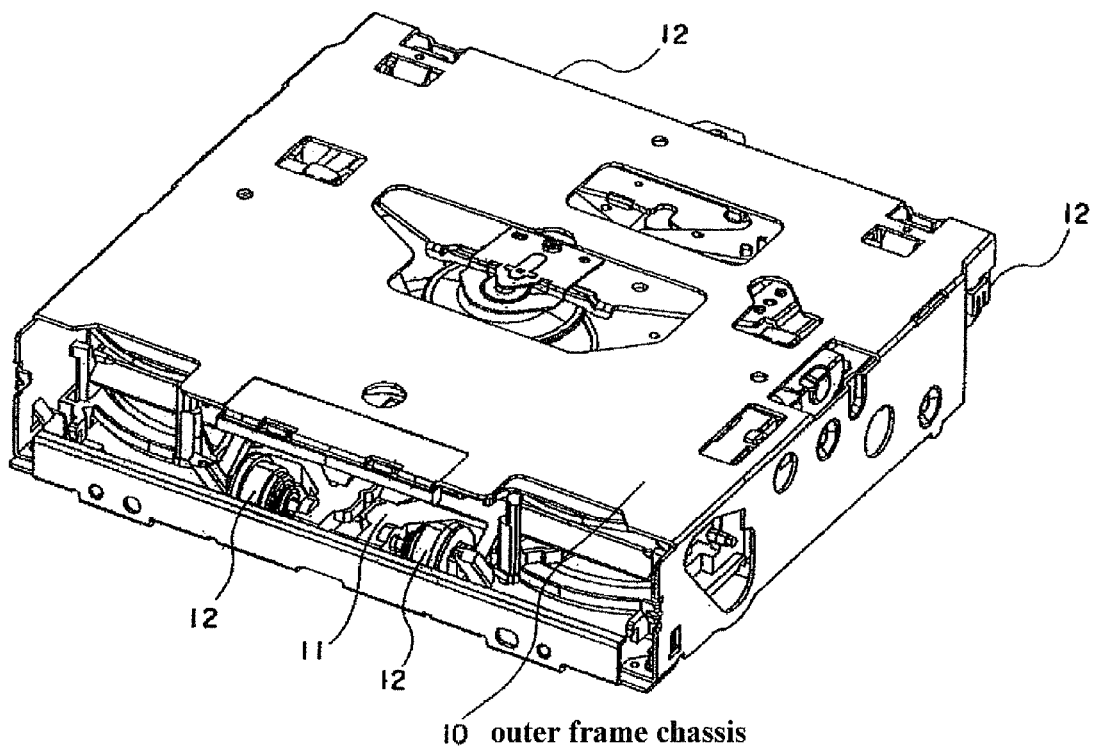
FIG. 5 is a perspective view showing an example of a structure of a conventional in-vehicle CD player.

This bottom surface 2a of the viscous-fluid-sealing damper 1 is fixed to an outer frame chassis 10 of an in-vehicle CD player illustrated in FIG. 5, and an installation shaft 3 set up on a mechanism chassis 11 is inserted into the shaft receiving section 2c.

As for the installation shaft 3, a swollen head 3b is formed at a tip of a shaft component 3a as shown in FIG. 2. Additionally, within the shaft receiving section 2c, there are formed an insertion concave portion 2d, and a latching concave portion 2e extending to an innermost portion of the insertion concave portion 2d. On the bottom surface 2a, there is formed a cylindrical convex portion 2f having at least one slit extending along radial direction thereof. Upper ends of the insertion concave portion 2d and the cylindrical convex portion 2f are formed in an R-shape.

As shown in FIG. 2, when the installation shaft 3 is guided to an R-shape portion of the insertion concave portion 2d according to an arrow direction to thereby push an entrance of the insertion concave portion 2d, the bursiform section 2b is elastically deformed, and then the shaft receiving section 2c moves until it contacts the bottom surface 2a. At this time, the shaft receiving section 2c is guided to the R-shaped upper edge of the cylindrical convex portion 2f, and then moves to a bottom of the cylindrical convex portion 2f. At this time, since the viscous-fluid in the cylindrical convex portion 2f trapped by the shaft receiving section 2c flows out of the slit provided on the cylindrical convex portion 2f, the shaft receiving section 2c is not strongly resisted by the viscous-fluid.

Figure 6:
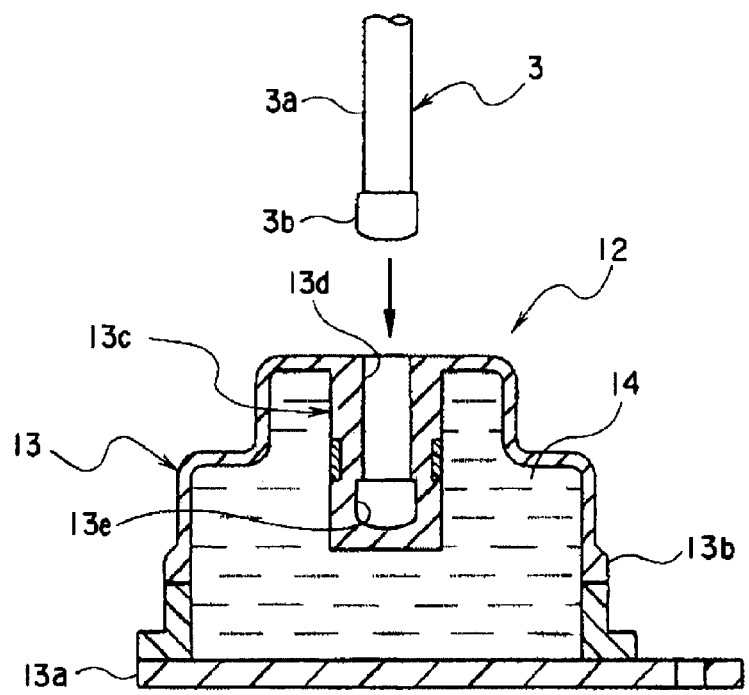
FIG. 6 is a sectional view showing an example of a conventional viscous-fluid-sealing damper.
Figure 7:
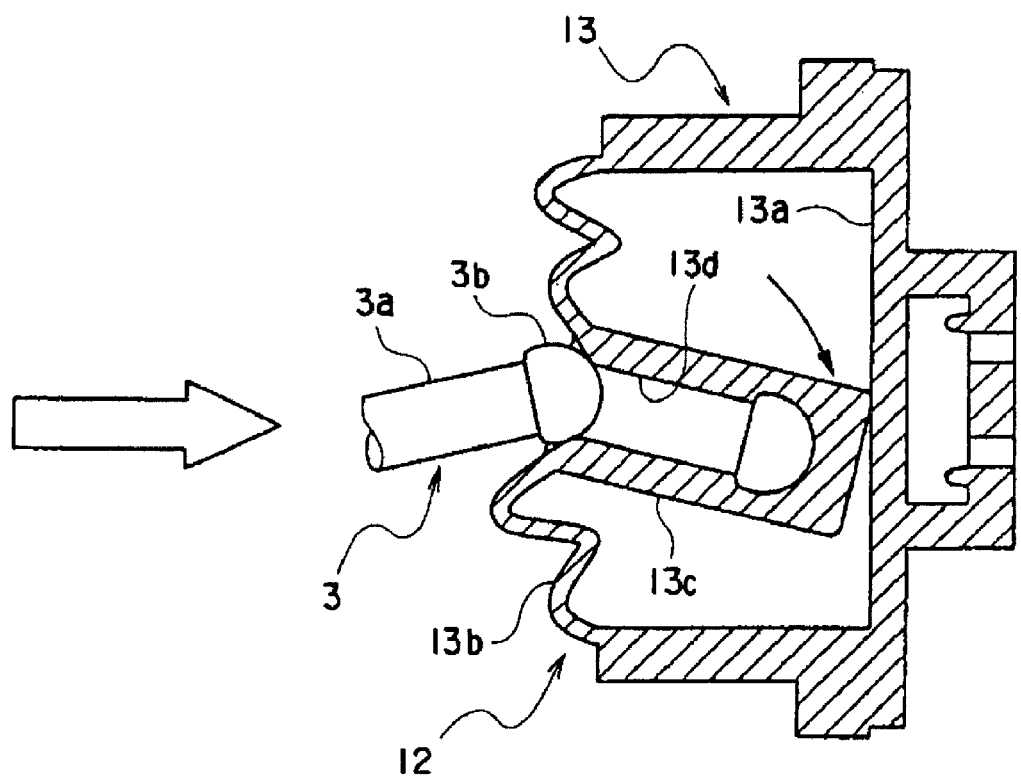
FIG. 7 is a sectional view showing an operating state of the same viscous-fluid-sealing damper as above.

In this manner, the installation shaft 3 is inserted into the insertion concave portion 2d of the shaft receiving section 2c fixed to a predetermined position, and then the swollen head 3b of the shaft receiving section 2c moves into the latching concave portion 2e, so that the installation shaft 3 is fitted in the shaft receiving section 2c. As described above, since the installation shaft 3 is inserted into the shaft receiving section 2c fixed to the predetermined position, the installation shaft 3 can be reliably and stably inserted to the predetermined position. In an actual operating state, as shown in FIG. 6, a shaft receiving section 13c is located near a center inside a partition wall spaced apart from a bottom surface 13a, and this shaft receiving section 13c can freely move vertically, horizontally, or back and forth to thereby be resisted by a viscous-fluid 14, so that damping effects can be obtained.

Second Embodiment

Figure 3:
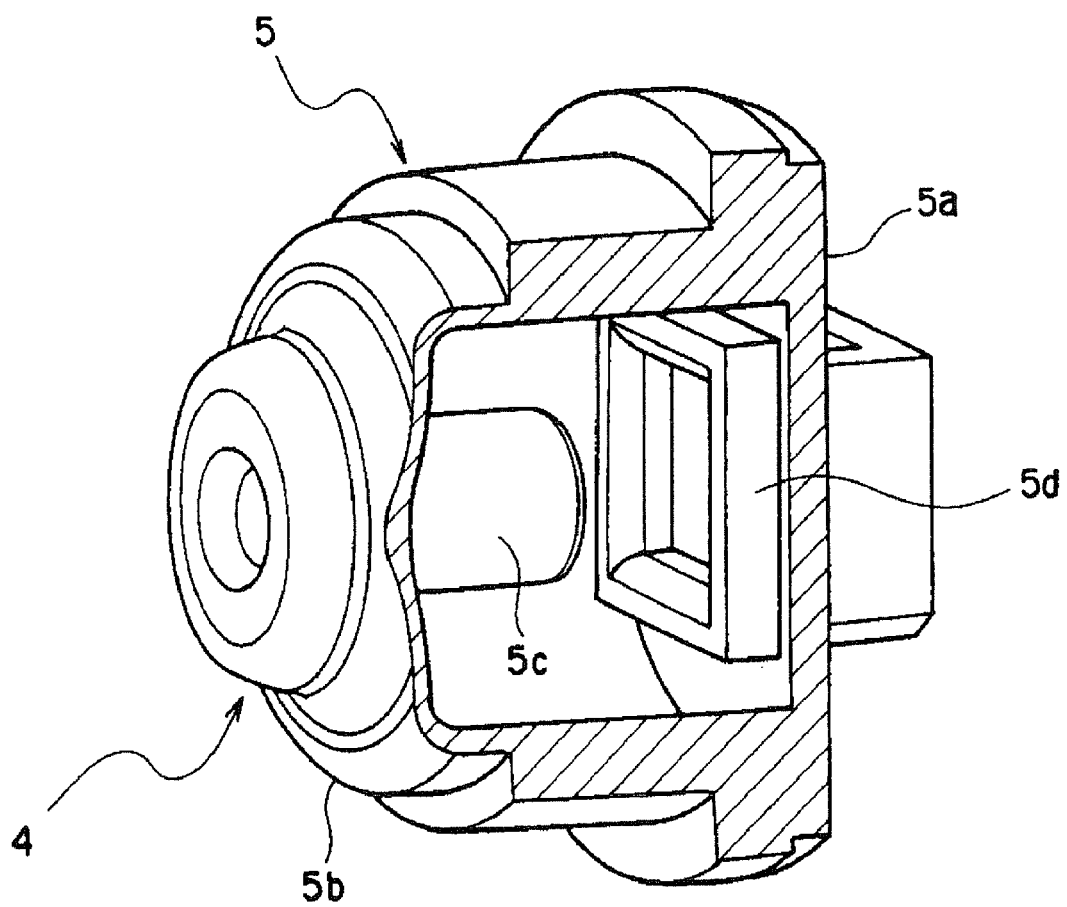
FIG. 3 is a perspective view showing a viscous-fluid-sealing damper with a part thereof notched according to a second embodiment of the present invention.

FIG. 3 is a perspective view showing a viscous-fluid-sealing damper 4 with a part thereof notched according to a second embodiment of the present invention. In this embodiment, a shaft receiving section 5c provided on a bursiform section 5b of a partition wall 5 of the viscous-fluid-sealing damper 4 is positioned by four surfaces of a boxy convex portion 5d formed in a quadrangular shape provided on a bottom surface 5a. Configurations other than the above are similar to those of the first embodiment. In this embodiment, since the viscous-fluid in the boxy convex portion 5d flows out of four corners of the boxy convex portion 5d, a slit need not be provided on the boxy convex portion 5d.

Third Embodiment

Figure 4:
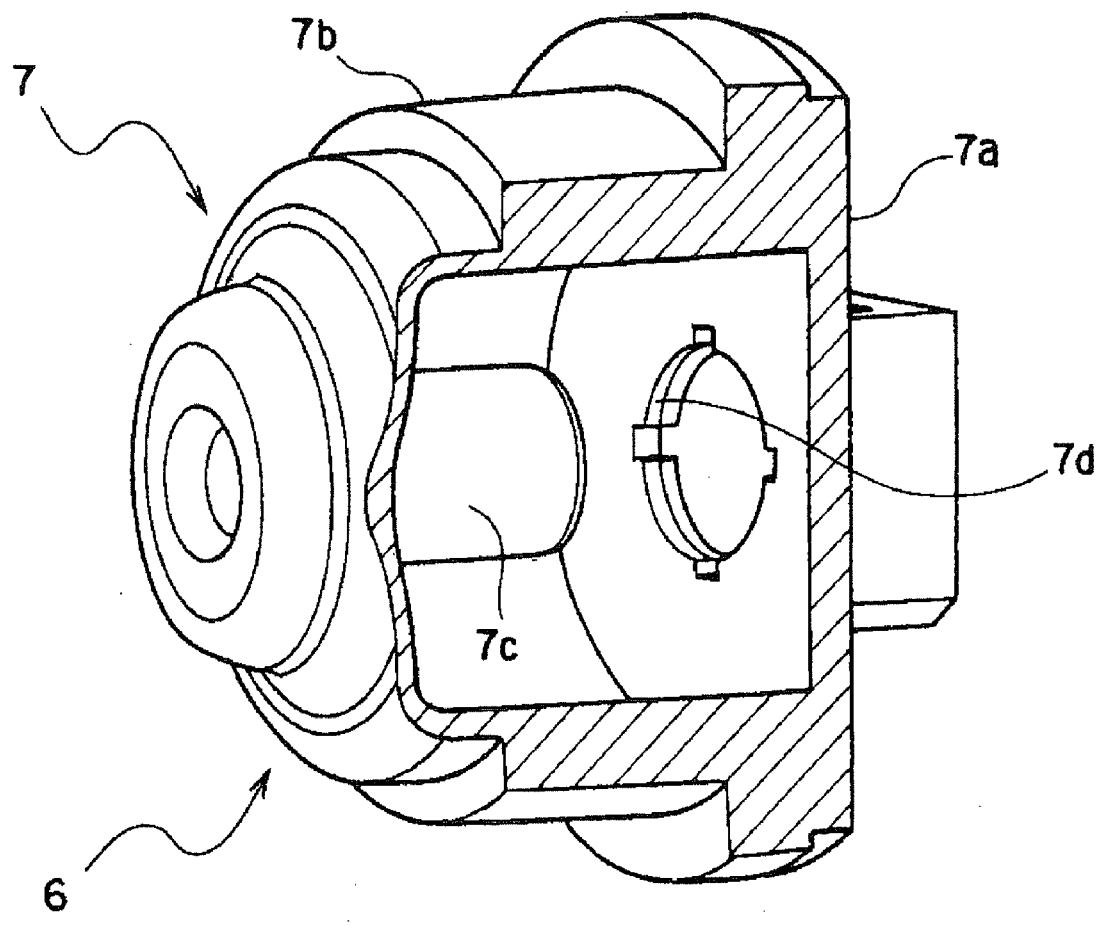
FIG. 4 is a perspective view showing a viscous-fluid-sealing damper with a part thereof notched according to a third embodiment of the present invention.

FIG. 4 is a perspective view showing a viscous-fluid-sealing damper 6 with a part thereof notched according to a third embodiment of the present invention. In this embodiment, a shaft receiving section 7c provided on a bursiform section 7b of a partition wall 7 of the viscous-fluid-sealing damper 6 is positioned by a cylindrical concave portion 7d provided on a bottom surface 7a. On the cylindrical concave portion 7d, a plurality of grooves out of which a viscous-fluid flows are provided. Configurations other than the above are similar to those of the first embodiment.

The embodiments are configured as described above, but the present invention is not limited to these, and for example, in the second embodiment, the boxy convex portion 5d may be formed in a triangular or pentagonal shape instead of the quadrangular one.

Further, a notch used for a slip resistance may be provided on, or a plate-like member having a large friction coefficient may be adhered to the bottom surface of the viscous-fluid-sealing damper. In a manner described above, even if the shaft receiving section is prevented from largely slipping after contacting the bottom surface, the shaft receiving section does not incline largely, thus enabling to obtain the effect of the present invention.

What is claimed is:

1. A viscous-fluid-sealing damper, comprising:
 a rubber-elastic shaft receiving section having a cylindrical outer shape for receiving an installation shaft in such a manner as to insert and fit the installation shaft having a swollen head into an insertion concave portion of the shaft receiving section;
 a partition wall for encapsulating a viscous-fluid therein, at least a part of the partition wall being formed of a rubber-elastic diaphragm, and the partition wall extending to a periphery of an upper edge of the shaft receiving section such that the shaft receiving section extends toward an inward side of the partition wall; and
 a positioning section, mounted at a position which is on a bottom surface of the partition wall and which faces the shaft receiving section, having an inner surface that limits an inserting direction of the installation shaft by controlling a position of an outer surface of the cylindrical outer shape of the shaft receiving section when the shaft receiving section is close to the bottom surface,
 wherein the positioning section is formed in a cylindrical shape, has an R-shape on an upper edge of the inner surface, and has at least one slit extending along an axial direction of the cylindrical shape.

2. A viscous-fluid-sealing damper, comprising:
 a rubber-elastic shaft receiving section having a cylindrical outer shape for receiving an installation shaft in such a manner as to insert and fit the installation shaft having a swollen head into an insertion concave portion of the shaft receiving section;
 a partition wall for encapsulating a viscous-fluid therein, at least a part of the partition wall being formed of a rubber-elastic diaphragm, and the partition wall extending to a periphery of an upper edge of the shaft receiving section such that the shaft receiving section extends toward an inward side of the partition wall; and
 a positioning section, mounted at a position which is on a bottom surface of the partition wall and which faces the shaft receiving section, having an inner surface that limits an inserting direction of the installation shaft by controlling a position of an outer surface of the cylindrical outer shape of the shaft receiving section when the shaft receiving section is close to the bottom surface,
 wherein the positioning section is formed in a polygonal shape.

3. A viscous-fluid-sealing damper, comprising:
 a rubber-elastic shaft receiving section having a cylindrical outer shape for receiving an installation shaft in such a manner as to insert and fit the installation shaft having a swollen head into an insertion concave portion of the shaft receiving section;
 a partition wall for encapsulating a viscous-fluid therein, at least a part of the partition wall being formed of a rubber-elastic diaphragm, and the partition wall extending to a periphery of an upper edge of the shaft receiving section such that the shaft receiving section extends toward an inward side of the partition wall; and
 a positioning section, mounted at a position which is on a bottom surface of the partition wall and which faces the shaft receiving section, having an inner surface that limits an inserting direction of the installation shaft by controlling a position of an outer surface of the cylindrical outer shape of the shaft receiving section when the shaft receiving section is close to the bottom surface,
 wherein the positioning section is a concavity formed in a cylindrical shape on the bottom surface of the partition wall, has at least one groove extending along an axial direction of the cylindrical shape, and has an R-shape on an upper edge of the inner surface of the positioning section.

* * * * *